(12) United States Patent
Namikawa et al.

(10) Patent No.: US 8,978,815 B2
(45) Date of Patent: Mar. 17, 2015

(54) ELECTRIC POWER STEERING APPARATUS

(71) Applicant: JTEKT Corporation, Osaka-shi, Osaka (JP)

(72) Inventors: Isao Namikawa, Okazaki (JP); Terutaka Tamaizumi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/182,392

(22) Filed: Feb. 18, 2014

(65) Prior Publication Data

US 2014/0238770 A1 Aug. 28, 2014

(30) Foreign Application Priority Data

Feb. 28, 2013 (JP) ................................. 2013-039399

(51) Int. Cl.
*B62D 5/04* (2006.01)
*B62D 6/00* (2006.01)

(52) U.S. Cl.
CPC .............. *B62D 5/0463* (2013.01); *B62D 6/008* (2013.01)
USPC ............................... 180/446; 180/444; 701/41

(58) Field of Classification Search
USPC ........... 180/443, 444, 446; 701/41, 42, 43, 44
See application file for complete search history.

(56) References Cited

U.S. PATENT DOCUMENTS

| | | | | |
|---|---|---|---|---|
| 6,925,371 B2 * | 8/2005 | Yasui et al. | ...................... | 701/72 |
| 6,931,313 B2 * | 8/2005 | Kato et al. | ...................... | 701/41 |
| 6,952,635 B2 * | 10/2005 | Yasui et al. | ...................... | 701/41 |
| 7,171,296 B2 * | 1/2007 | Kato et al. | ...................... | 701/70 |
| 7,191,048 B2 * | 3/2007 | Aizawa et al. | ................... | 701/73 |
| 7,441,627 B2 * | 10/2008 | Ohta et al. | ...................... | 180/446 |

FOREIGN PATENT DOCUMENTS

JP B2-4453012 4/2010

* cited by examiner

*Primary Examiner* — Joseph Rocca
*Assistant Examiner* — Marc A Scharich
(74) *Attorney, Agent, or Firm* — Oliff PLC

(57) ABSTRACT

An electric power steering apparatus includes a controller that controls, based on an assist command value, driving of a motor used to apply assist torque to a steering mechanism. The controller calculates a first assist component based on a steering torque transmitted to the steering mechanism and calculates a steered angle command value based on the steering torque. The controller executes feedback control to cause a steered angle of steerable wheels to agree with the steered angle command value, thereby calculating a second assist component. The controller calculates the assist command value based on a value obtained by adding the assist components. The controller estimates a grip factor of the wheels on a road surface on which the wheels are traveling based on the steering torque, a first assist torque determined based on the first assist component, and a second assist torque determined based on the second assist component.

10 Claims, 8 Drawing Sheets

Fig.5
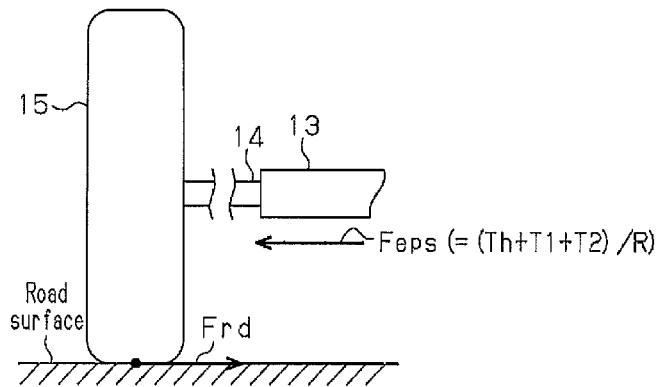
Fig.6(a) Fig.6(b)
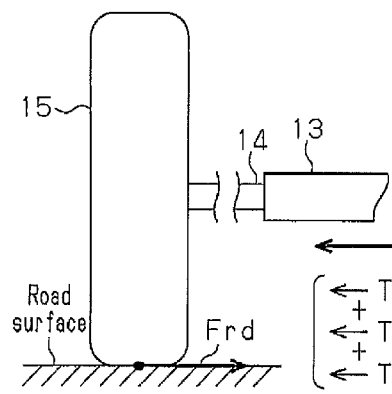 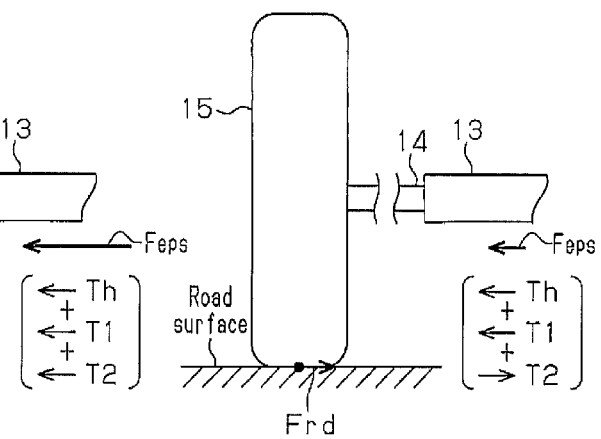

ELECTRIC POWER STEERING APPARATUS

CROSS-REFERENCE TO RELATED APPLICATIONS

This application is based on and claims priority from Japanese Patent Application No. 2013-039399, filed on Feb. 28, 2013, the entire contents of which are incorporated herein by reference.

BACKGROUND OF THE INVENTION

The present invention relates to an electric power steering apparatus that assists steering operation by a driver.

Electric power steering apparatuses have been known that assist a driver's steering operation by applying assist torque from a motor to a vehicle steering mechanism. Japanese Patent No. 4453012 describes an example of such an electric power steering apparatus.

The electric power steering apparatus of Japanese Patent No. 4453012 has a first reference model and a second reference model. The first reference model defines a target steering torque based on a steered angle of a steering wheel. The second reference model defines a target steered angle of steerable wheels based on a steering torque of the steering wheel. Driving of the motor is controlled based on these two reference models (ideal models). Specifically, this electric power steering apparatus determines a first assist component by executing torque feedback control to cause the actual steering torque to agree with a target steering torque and determines a second assist component by executing steered angle feedback control to cause the actual steered angle to agree with a target steered angle. Driving of the motor is controlled based on a value obtained by adding the first and second assist components. This configuration applies an assist torque determined based on the first assist component, so that a steering torque can always be set at an optimum value. Further, this configuration applies an assist torque determined based on the second assist component, so that reverse input vibration transferred from the steerable wheels can be canceled.

SUMMARY OF THE INVENTION

While a vehicle is traveling on a low μ road, reactive force of a road surface acting on the steerable wheels is smaller than that when the vehicle is traveling on a normal road (high μ road). This provides a lighter steering sensation to the driver driving on the low μ road than the sensation on the normal road. Such a difference in steering sensation allows the driver to notice that the vehicle is traveling on the low μ road. In this way, a steering sensation is an important information source for the driver as the driver can know the road surface condition from the steering sensation.

However, in the electric power steering apparatus of Japanese Patent No. 4453012, executing the steered angle feedback control always causes the actual steered angle to follow a target steered angle irrespective of the road surface condition during traveling, so that the steerable wheels are steered irrespective of the road surface condition. Accordingly, the driver finds difficulty in obtaining a steering sensation that reflects the road surface condition. In view of these circumstances, what is particularly needed in the electric power steering apparatus of Japanese Patent No. 4453012 is means for allowing estimation of a grip condition (grip factor) of steerable wheels on the road surface on which the steerable wheels are moving with the intention of allowing the driver to notice the road surface condition.

It is therefore an objective of the present invention to provide an electric power steering apparatus that allows estimation of a grip factor of a steerable wheel while executing steered angle feedback control.

To achieve the foregoing objective and in accordance with one aspect of the present invention, an electric power steering apparatus is provided that includes an assist mechanism and a controller. The assist mechanism applies assist torque from a motor to a vehicle steering mechanism. The controller controls driving of the motor based on an assist command value. The controller includes a first assist component calculating unit, a steered angle command value calculating unit, a second assist component calculating unit, and an assist command value calculating unit. The first assist component calculating unit calculates a first assist component based on a steering torque transmitted to the steering mechanism. The steered angle command value calculating unit calculates, based on the steering torque, steered angle command value, which is a target value of a steered angle of a steerable wheel. The second assist component calculating unit executes steered angle feedback control to cause the steered angle of the steerable wheel to agree with the steered angle command value, thereby calculating a second assist component. The assist command value calculating unit calculates the assist command value based on a value obtained by adding the first and second assist components. The controller estimates a grip factor of the steerable wheel on a road surface on which the steerable wheel is traveling based on the steering torque, a first assist torque determined based on the first assist component, and a second assist torque determined based on the second assist component.

According to this configuration, the execution of the steered angle feedback control establishes equilibrium between the axial force acting on the steerable wheel from the electric power steering apparatus and the road surface reactive force acting on the steerable wheel from the road surface on which the steerable wheel is traveling. The axial force can be derived based on the total of the steering torque, the first assist torque determined based on the first assist component, and the second assist torque determined based on the second assist component. The road surface reactive force correlates with the grip factor of the steerable wheel on a road surface on which the steerable wheel is traveling. This allows estimation of the grip factor of the steerable wheel based on the steering torque and the first and second assist torques.

In the above described electric power steering apparatus, the controller preferably estimates the grip factor of the steerable wheel based on a reactive force quantity ratio obtained by dividing the second assist torque by the sum of the steering torque and the first assist torque.

The first assist torque determined based on the first assist component acts on the steering mechanism to assist a driver's steering operation. Hence, the first assist torque acts in a direction that is basically the same as the direction of the steering torque. Meanwhile, the second assist torque determined based on the second assist component may act in the same direction as the steering torque or in a direction opposite to the direction of the steering torque. When the second assist torque acts in a direction opposite to that of the steering torque, the closer the sum of the steering torque and the first assist torque to the magnitude of the second assist torque, the smaller the total of these three values becomes. In other words, the magnitude of the road surface reactive force is reduced, and this indicates a reduction of the grip factor of the steerable wheel. Accordingly, by obtaining the reactive force quantity ratio by dividing the second assist torque by the sum of the steering torque and the first assist torque as in the aforementioned configuration, it can be estimated that the grip factor of the steerable wheel becomes smaller as the reactive force quantity ratio becomes closer to −1. It can also be estimated that the grip factor of the steerable wheel becomes higher as the reactive force quantity ratio goes farther from −1.

In the above described electric power steering apparatus, the controller preferably estimates that the grip factor of the steerable wheel has reached a value that causes slipping of the steerable wheel if the reactive force quantity ratio is −1.

This configuration allows slipping of the steerable wheel to be easily detected.

In the above described electric power steering apparatus, the controller preferably further includes an adjusting unit that decreases the absolute value of the second assist component included in the assist command value as the reactive force quantity ratio becomes closer to a value that causes slipping of the steerable wheel.

According to this configuration, adjustment is made such that the absolute value of the second assist component included in the assist command value becomes smaller as the reactive force quantity ratio becomes closer to the value that causes slipping of the steerable wheel, specifically as the grip factor of the steerable wheel becomes lower. This reduces the absolute value of an assist torque determined based on the steered angle feedback control on a low μ road, where the grip factor of the steerable wheel is low. Thus, the steerable wheel is steered in accordance with the road surface condition. This allows the driver to obtain a steering sensation corresponding to the low μ road.

If the steering wheel is in a neutral position, for example, the steering torque and the first assist component are zero. In this case, if the second assist torque acts in a direction opposite to the direction of the steering torque, the value of the reactive force quantity ratio becomes −∞. This may lead to erroneous determination of the grip factor of the steerable wheel. If the absolute value of the second assist component included in the assist command value is decreased based on such an erroneously determined grip factor, the assist command value might be adjusted improperly, so that a steering sensation might be impaired.

Accordingly, in the above described electric power steering apparatus, if the steering torque is detected or estimated to be zero, the adjusting unit preferably does not decrease the absolute value of the second assist component included in the assist command value.

According to this configuration, if the steering torque is detected or estimated to be zero, specifically if it is detected or estimated that the steering wheel is in a neutral position so that the grip factor of the steerable wheel might be determined erroneously, decreasing the absolute value of the second assist component included in the assist command value is not made. This reduces the possibility of improper adjustment of the assist command value, thereby further improving the steering sensation.

In the above described electric power steering apparatus, the adjusting unit may gradually change the second assist component included in the assist command value in response to change of the reactive force quantity ratio.

According to this configuration, the second assist component included in the assist command value is changed gradually in response to change of the reactive force quantity ratio. Thus, rapid change of an assist torque is prevented. This prevents rapid change of the steering sensation, so that sense of discomfort experienced by the driver is alleviated.

In the above described electric power steering apparatus, the adjusting unit may set a value of the reactive force quantity ratio that might cause slipping of the steerable wheel as a first threshold value. In addition, if the reactive force quantity ratio is less than or equal to the first threshold value, the adjusting unit may eliminate the second assist component from the assist command value.

According to this configuration, if the reactive force quantity ratio is less than or equal to the first threshold value, specifically if the occurrence of slipping at the steerable wheel is highly likely, the second assist component is eliminated from the assist command value. This prevents the assist torque determined based on the steered angle feedback control from acting on the steering mechanism. Thus, the steerable wheel is steered in accordance with the road surface condition. As a result, the driver is warned of a situation where the occurrence of slipping at the steerable wheel is highly likely since the driver notices this situation based on the steering sensation. This increases the safety of traveling of the vehicle.

In the above described electric power steering apparatus, the adjusting unit may set a second threshold value greater than the first threshold value. In addition, if the reactive force quantity ratio is greater than or equal to the second threshold value, the adjusting unit does not necessarily need to adjust the second assist component included in the assist command value.

According to this configuration, if the reactive force quantity ratio is greater than or equal to the second threshold value, specifically if the occurrence of slipping at the steerable wheel is not likely, the assist command value includes the second assist component. This causes the second assist torque to act on the steering mechanism. This cancels reverse input vibration from the steerable wheel in a situation where the occurrence of slipping at the steerable wheel is not likely, thereby achieving a favorable steering sensation.

In the above described electric power steering apparatus, the controller may use a map to calculate the first assist component determined based on the steering torque. The map is one of a plurality of maps defining different magnitudes of the first assist component corresponding to the steering torque. The controller preferably selects a map to be used for calculation of the first assist component from the maps such that the absolute value of the first assist component corresponding to the absolute value of the steering torque increases as the reactive force quantity ratio becomes closer to a value that causes slipping of the steerable wheel.

According to this configuration, the assist toque is increased to lighten the steering as the possibility of the occurrence of slipping at the steerable wheel is increased, so that the driver can reliably notice reduction of the grip factor of the steerable wheel.

In the above described electric power steering apparatus, if the total of the steering torque, the first assist torque determined based on the first assist component, and the second assist torque determined based on the second assist component is zero, the controller may estimate that the grip factor has reached a value that causes slipping of the steerable wheel.

This configuration allows slipping of the steerable wheel to be easily detected.

Other aspects and advantages of the invention will become apparent from the following description, taken in conjunction with the accompanying drawings, illustrating by way of example the principles of the invention.

BRIEF DESCRIPTION OF THE DRAWINGS

FIG. 5 is a diagram schematically showing a relationship between torque acting from the electric power steering apparatus of the embodiment on a steerable wheel and road surface reactive force established in this electric power steering apparatus;

FIGS. 6(a) and 6(b) are diagrams each schematically showing a relationship between a steering torque, a first assist torque, and a second assist torque established in the electric power steering apparatus according to the embodiment;

DETAILED DESCRIPTION OF THE PREFERRED EMBODIMENTS

An electric power steering apparatus according to one embodiment of the present invention will now be described by referring to FIGS. 1 to 7. The outline of the electric power steering apparatus will be described first.

Figure 1:
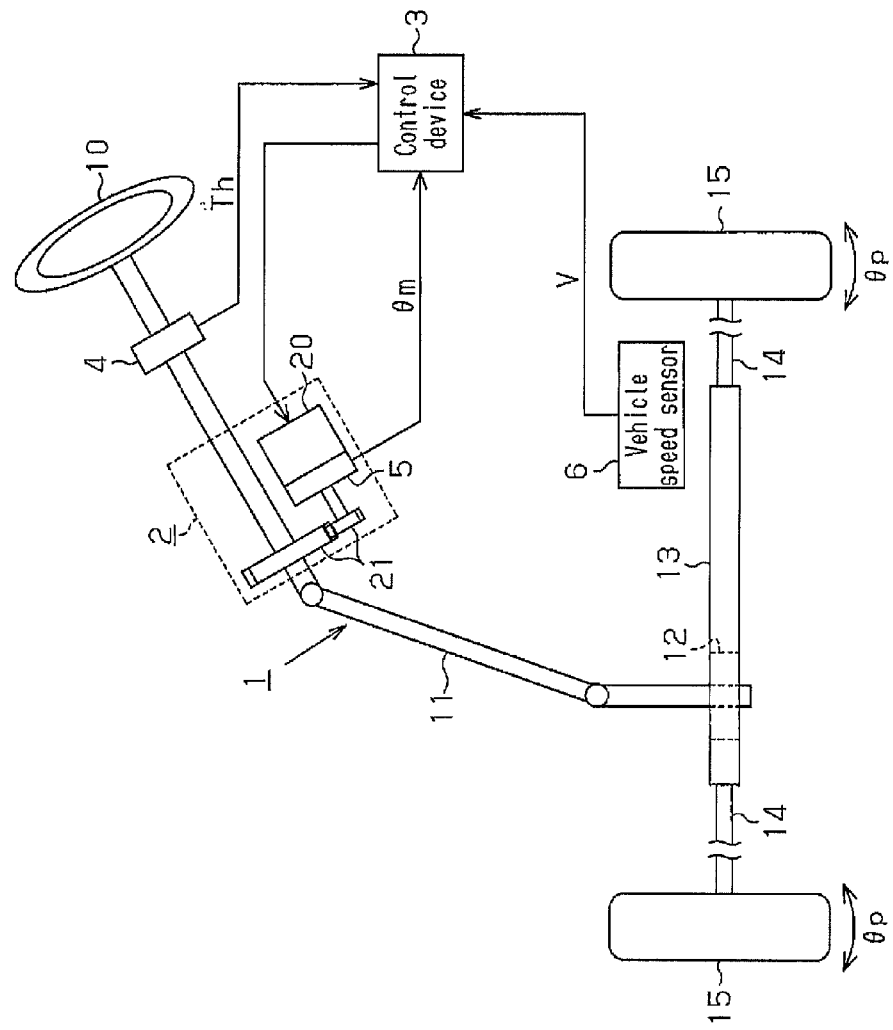
FIG. 1 is a block diagram schematically showing the outline of an electric power steering apparatus according to one embodiment of the present invention.

As shown in FIG. 1, the electric power steering apparatus includes a steering mechanism 1, which steers steerable wheels 15 based on a driver's operation of a steering wheel 10, and an assist mechanism 2 that assists a driver in performing a steering operation.

The steering mechanism 1 includes a steering shaft 11, which rotates integrally with the steering wheel 10. A rack shaft 13 is coupled to the lower end portion of the steering shaft 11 through a rack and pinion mechanism 12. Accordingly, if the steering shaft 11 rotates in response to steering operation by the driver, the rotary motion of the steering shaft 11 is converted to axial reciprocating linear motion of the rack shaft 13 through the rack and pinion mechanism 12. The reciprocating linear motion of the rack shaft 13 is transmitted to the steerable wheels 15 through tie rods 14 coupled to opposite ends of the rack shaft 13. This changes the steered angle θp of each steerable wheel 15, thereby changing the traveling direction of the vehicle.

The assist mechanism 2 includes a motor 20 that applies assist torque to the steering shaft 11. The motor 20 is a three-phase AC motor. Rotation of the motor 20 is transmitted to the steering shaft 11 through a gear mechanism 21. Thereby, the motor torque is applied to the steering shaft 11 and a steering operation is thus assisted.

The electric power steering apparatus includes various types of sensors that detect the amount of operation of the steering wheel 10 and state quantities of the vehicle. As an example, the steering shaft 11 is provided with a torque sensor 4 that detects torque (steering torque) Th applied to the steering shaft 11 in response to steering operation by the driver. The motor 20 is provided with a rotation angle sensor 5 that detects a rotation angle θm of the motor 20. The vehicle is provided with a vehicle speed sensor 6 that detects a traveling speed V of the vehicle. A control device (controller) 3 receives outputs from these sensors. The control device 3 controls driving of the motor 20 based on the output from each sensor.

Figure 2:
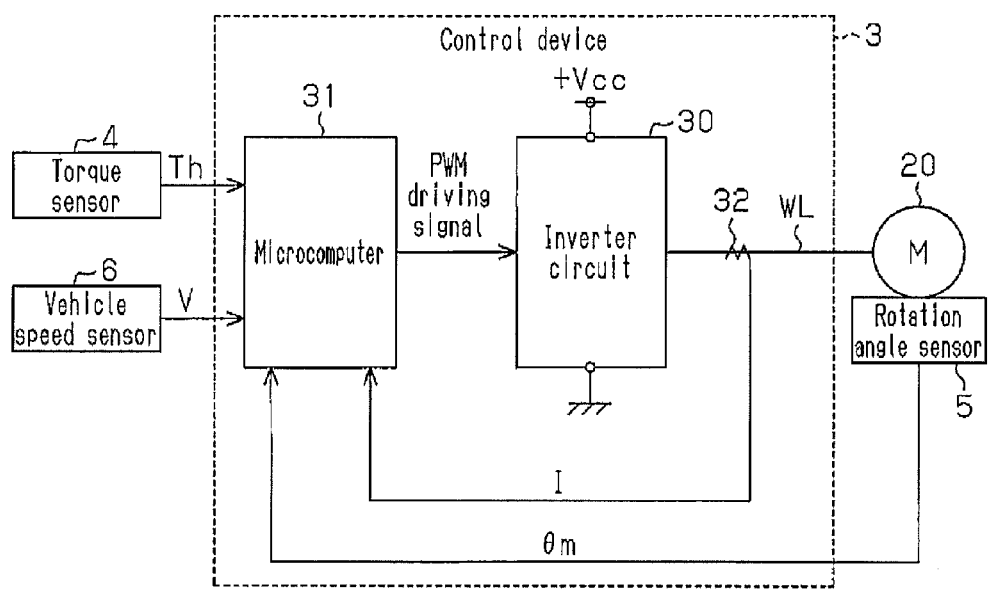
FIG. 2 is a block diagram showing the configuration of a control device of the electric power steering apparatus according to the embodiment.

As shown in FIG. 2, the control device 3 includes an inverter circuit 30 and a microcomputer 31. The inverter circuit 30 converts DC power supplied from a power supply such as an on-board battery (power supply voltage+Vcc) to AC power of three phases (U phase, V phase, and W phase). The microcomputer 31 drives the inverter circuit 30 by pulse width modulation (PWM).

The inverter circuit 30 converts DC power supplied from the power supply to three-phase AC power based on a PWM driving signal given from the microcomputer 31. The three-phase AC power is supplied to the motor 20 through a feed line WL. The feed line WL is provided with a current sensor 32 that detects a current value I of each phase flowing through the feed line WL. The microcomputer 31 receives an output from the current sensor 32. For the illustrative purposes, FIG. 2 shows one feed line WL represents lines for the three phases and one current sensor 32 represents three sensors for the respective phases.

The microcomputer 31 further receives outputs from each of the torque sensor 4, the vehicle speed sensor 6, and the rotation angle sensor 5. The microcomputer 31 generates a PWM driving signal based on the steering torque Th, the vehicle speed V, the current value I of each phase, and the motor rotation angle θm detected by these sensors. The microcomputer 31 outputs the PWM driving signal to the inverter circuit 30 to drive the inverter circuit 30 by PWM, thereby controlling driving of the motor 20.

Figure 3:
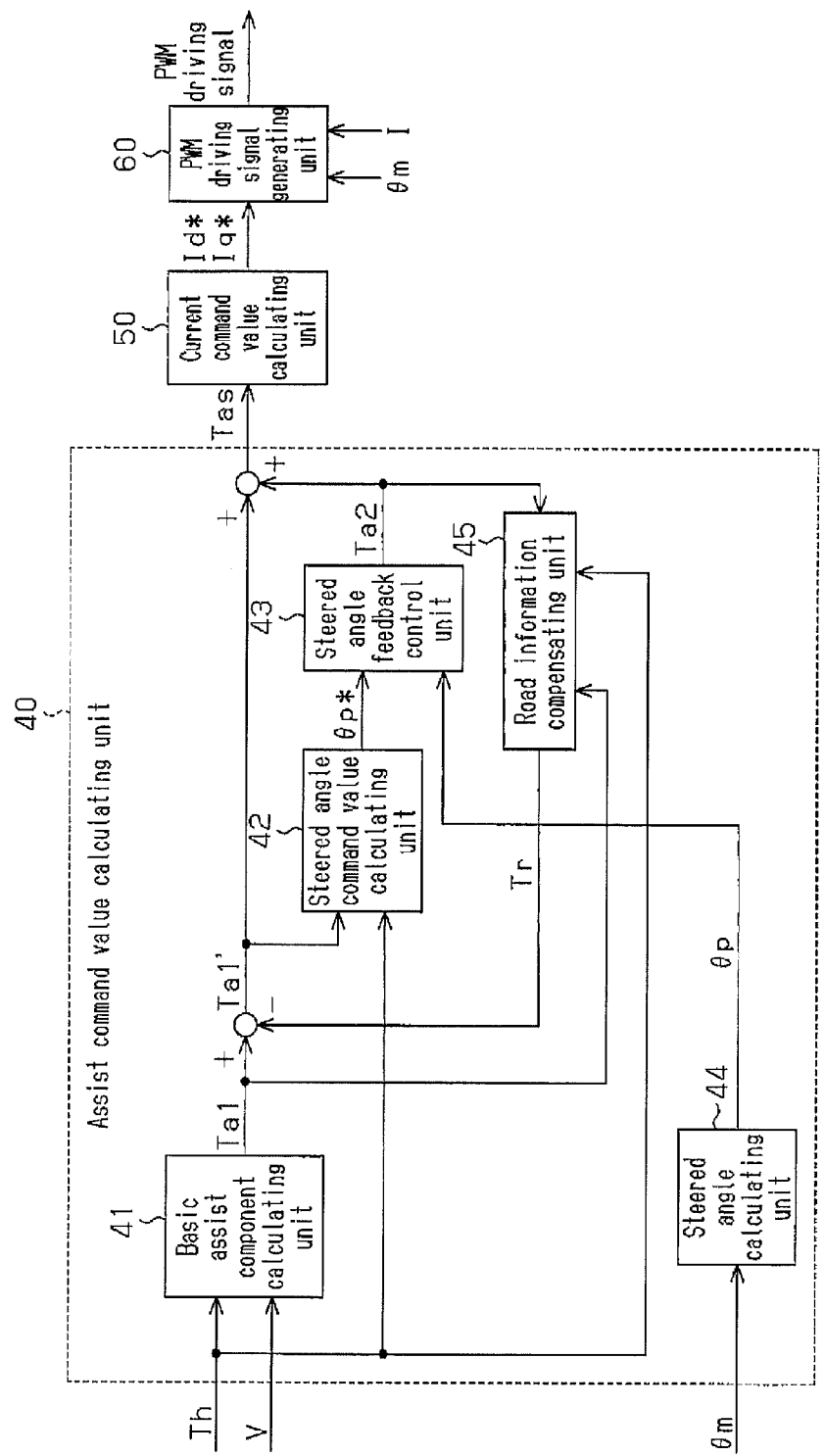
FIG. 3 is a control block diagram showing the configuration of the control device of the electric power steering apparatus according to the embodiment.

The following describes in detail the control of driving of the motor 20 by the microcomputer 31 by referring to the control block diagram of FIG. 3.

As shown in FIG. 3, the microcomputer 31 includes an assist command value calculating unit 40 that calculates an assist command value Tas based on the steering torque Th, the vehicle speed V, and the motor rotation angle θm.

The assist command value calculating unit 40 includes a basic assist component calculating unit (first assist component calculating unit) 41 that calculates a first assist component Ta1, which is a primary component of the assist command value Tas, based on the vehicle speed V and the steering torque Th. As shown for example in FIG. 4, the basic assist component calculating unit 41 increases the absolute value of the first assist component Ta1 as the absolute value of the steering torque Th becomes greater or as the vehicle speed V becomes lower. The basic assist component calculating unit 41 calculates the first assist component Ta1 using a map such as that of FIG. 4.

As shown in FIG. 3, the assist command value calculating unit 40 subtracts a correction value Tr from the first assist component Ta1 calculated by the basic assist component calculating unit 41, and inputs a corrected first assist component Ta1' (Ta1'=Ta1−Tr) to a steered angle command value calculating unit 42.

The steered angle command value calculating unit 42 captures the steering torque Th in addition to the corrected first assist component Ta1'. The steered angle command value calculating unit 42 adds the corrected first assist component Ta1' and the steering torque Th to obtain a driving torque, and calculates a steered angle command value θp* from the driving torque based on an ideal model. The steered angle command value θp* is a target value of the steered angle θp. The ideal model is experimentally obtained in advance by modeling an ideal steered angle corresponding to a driving torque, for example. The steered angle command value calculating unit 42 outputs the calculated steered angle command value θp* to a steered angle feedback control unit 43.

As shown in FIG. 1, the motor 20 is coupled to the steering shaft 11 through the gear mechanism 21. This forms a correlation between the motor rotation angle θm and the rotation angle of the steering shaft 11. Accordingly, a correlation is formed further between the motor rotation angle θm and the steered angle θp of the steerable wheels 15. As shown in FIG. 3, the assist command value calculating unit 40 includes a steered angle calculating unit 44 that calculates an actual steered angle θp of the steerable wheels 15 from the motor rotation angle θm using these correlations. The steered angle calculating unit 44 outputs the calculated actual steered angle θp to the steered angle feedback control unit 43.

In order for the actual steered angle θp to correspond to the steered angle command value θp*, the steered angle feedback control unit 43 executes feedback control based on the difference between the actual steered angle θp and the steered angle command value θp* to calculate a second assist component Ta2. In this way, the steered angle feedback control unit 43 of this embodiment functions as a second assist component calculating unit.

The assist command value calculating unit 40 adds the second assist component Ta2 to the corrected first assist component Ta1' to obtain the assist command value Tas, and outputs the assist command value Tas to a current command value calculating unit 50.

The current command value calculating unit 50 calculates a current command value Iq* on the q-axis of a d/q coordinate system based on the assist command value Tas, and outputs the current command value Iq* to a PWM driving signal generating unit 60. In this embodiment, a current command value Id* on the d-axis is fixed at zero. The current command value calculating unit 50 further outputs the current command value Id* to the PWM driving signal generating unit 60.

The PWM driving signal generating unit 60 captures the motor rotation angle θm and the current value I of each phase in addition to the current command values Id* and Iq* from the current command value calculating unit 50. The PWM driving signal generating unit 60 converts the current value I of each phase to a d-axis current value and a q-axis current value of the d/q coordinate system using the motor rotation angle θm. Then, the PWM driving signal generating unit 60 executes feedback control based on the difference between the d-axis current value and the current command value Id* and the difference between the q-axis current value and the current command value Iq* such that the d-axis current value agrees with the current command value Id* and the q-axis current value agrees with the current command value Iq*, thereby generating a PWM driving signal. This PWM drives the inverter circuit 30 so that the motor 20 applies an assist torque to the steering shaft 11. In this way, assist control is executed to assist steering operation.

According to the aforementioned configuration, the assist command value Tas includes the second assist component Ta2 generated as a result of the steered angle feedback control. Further, an assist torque determined based on the second assist component Ta2 is applied from the motor 20 to the steering shaft 11. As a result, the steered angle θp of the steerable wheels 15 is controlled to follow the steered angle command value θp*. The steered angle feedback control maintains the steered angle θp of the steerable wheels 15 at the steered angle command value θp*, so that vibration of the steering mechanism 1 due to disturbance is reliably suppressed. Further, properly adjusting the ideal model forms arbitrary features by means of control without depending on the actual features of the vehicle on which the electric power steering apparatus is mounted. Specifically, a desired steering sensation is achieved.

In the electric power steering apparatus of this embodiment, the execution of the steered angle feedback control establishes equilibrium between the axial force Feps acting on the steerable wheels 15 from the electric power steering apparatus and the road surface reactive force Frd acting on the steerable wheels 15 from the road surface on which the steerable wheels 15 are traveling. The axial force Feps can be obtained by dividing, by a radius R of the steering shaft 11, the total of the steering torque Th, a first assist torque T1 determined based on the first assist component Ta1, and a second assist torque T2 determined based on the second assist component Ta2. Accordingly, the following expression (1) is established:

$$Frd=(Th+T1+T2)/R \qquad (1)$$

The road surface reactive force Frd correlates with the grip factor of the steerable wheels 15 on the road surface on which the steerable wheels 15 are traveling. This allows estimation of the grip factor of the steerable wheels 15 based on the total on the right-hand side of the expression (1). The grip factor is an index value defining the grip condition determined between the steerable wheels 15 and the road surface on which the steerable wheels 15 are traveling. A higher grip factor of the steerable wheels 15 shows a better grip condition of the steerable wheels 15 whereas a lower grip factor of the steerable wheels 15 shows a worse grip condition of the steerable wheels 15. The following specifically describes estimation of the grip factor of the steerable wheels 15.

The first assist torque T1 determined based on the assist control acts on the steering shaft 11 to assist steering operation by the driver. Hence, as shown in FIGS. 6(a) and 6(b), the first assist torque T1 acts in a direction that is basically the same as the direction of the steering torque Th. Meanwhile, the second assist torque T2 determined based on the steered angle feedback control may act in the same direction as the steering torque Th as shown in FIG. 6(a) or in a direction opposite to the direction of the steering torque Th as shown in FIG. 6(b). When the second assist torque T2 acts in a direction opposite to that of the steering torque Th, the closer the sum of the steering torque Th and the first assist torque T1 to the magnitude of the second assist torque T2, the smaller the magnitude defined on the right-hand side of the expression (1) becomes. In other words, the magnitude of the road surface reactive force Frd is reduced, and this indicates a reduction of the grip factor of the steerable wheels 15. In particular, the right-hand side of the expression (1) being zero indicates that the road surface reactive force Frd is zero. In this case, it can be determined that slipping is occurring at the steerable wheels 15. Accordingly, reduction of the grip factor of the steerable wheels 15 gives the second assist torque T2 a sign opposite to the sign of the steering torque Th and the first assist torque T1, while causing the absolute value of the second assist torque T2 to approach the absolute value of the sum of the steering torque Th and the first assist torque T1.

Thus, in this embodiment, a reactive force quantity ratio Rf obtained by the following expression (2) is used to determine whether the grip factor of the steerable wheels 15 is reduced:

$$Rf = T2/(T1 + Th) \qquad (2)$$

It is estimated that the closer to −1 the value of the reactive force quantity ratio Rf, the lower the grip factor of the steerable wheels 15 has become. In contrast, it is estimated that the more increased the value of the reactive force quantity ratio Rf positively relative to −1, specifically the more separated from −1 the reactive force quantity ratio Rf, the higher the grip factor of the steerable wheels 15 becomes. In this way, the grip factor of the steerable wheels 15 is estimated in this embodiment based on the reactive force quantity ratio Rf. The electric power steering apparatus of this embodiment adjusts the second assist component Ta2 included in the assist command value Tas based on the reactive force quantity ratio Rf. This adjustment will be described in detail below.

As shown in FIG. 3, the assist command value calculating unit 40 of this embodiment includes a road information compensating unit 45 that calculates the correction value Tr based on the steering torque Th and the first and second assist components Ta1 and Ta2.

Figure 7:
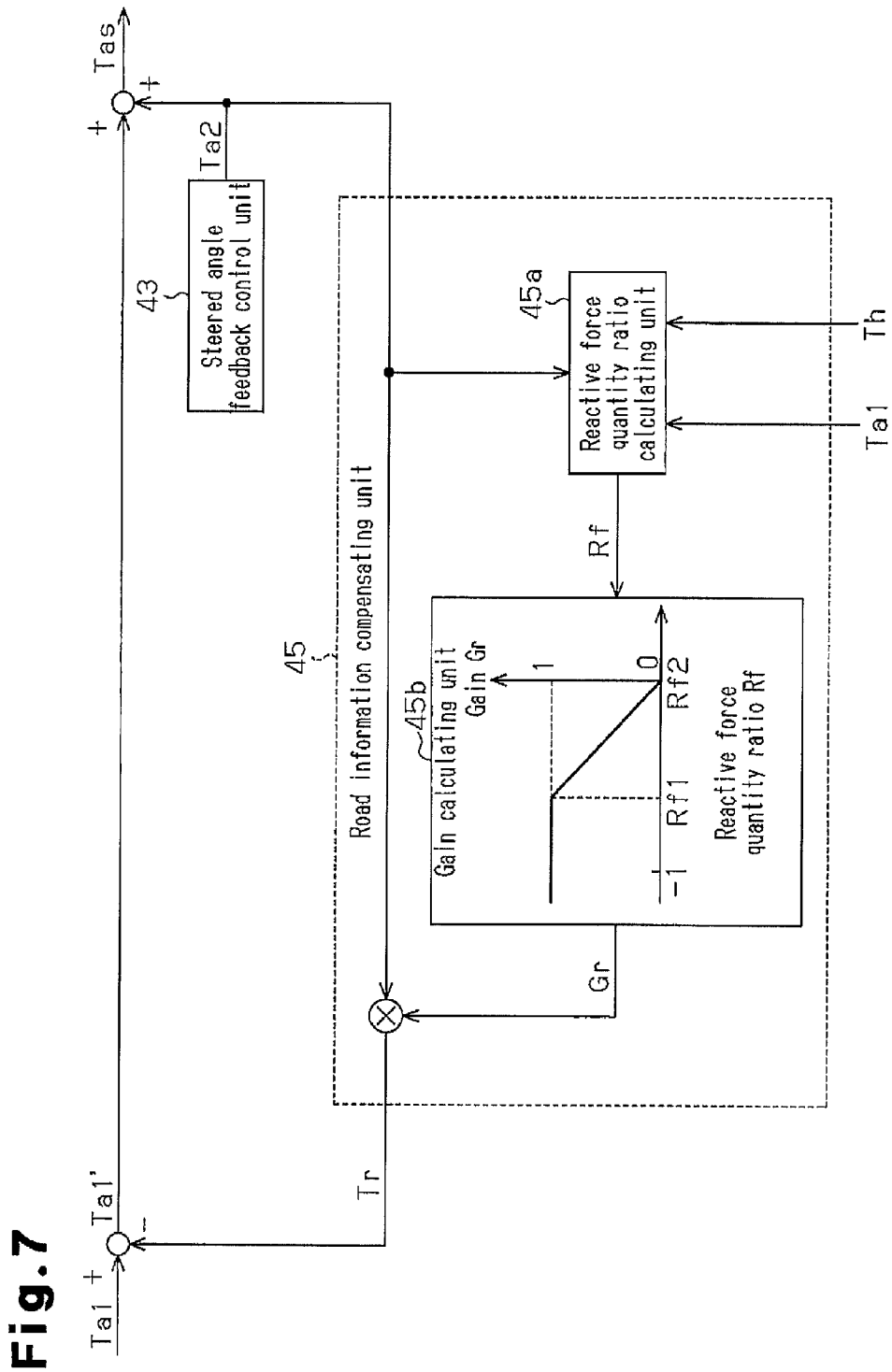
FIG. 7 is a control block diagram showing the configuration of a road information compensating unit in the control device of the embodiment.

As shown in FIG. 7, the road information compensating unit 45 is composed of a reactive force quantity ratio calculating unit 45a and a gain calculating unit 45b.

The reactive force quantity ratio calculating unit 45a calculates the first and second assist torques T1 and T2 from the first and second assist components Ta1 and Ta2, respectively, and then calculates the reactive force quantity ratio Rf from the steering torque Th and the first and second assist torques T1 and T2 based on the aforementioned expression (2). The reactive force quantity ratio calculating unit 45a outputs the calculated reactive force quantity ratio Rf to the gain calculating unit 45b.

As shown in the graph in FIG. 7, the gain calculating unit 45b calculates a gain Gr in the ways shown in items (a1) to (a3) below. A first threshold value Rf1 described below is a value of the reactive force quantity ratio Rf that might cause slipping of the steerable wheels 15. The first threshold value Rf1 is greater than −1. A second threshold value Rf2 described below is greater than the first threshold value Rf1. The threshold values Rf1 and Rf2 are both determined in advance experimentally, for example.

(a1) If the reactive force quantity ratio Rf satisfies −1≤Rf≤Rf1, specifically if the grip factor of the steerable wheels 15 is so low that the occurrence of slipping at the steerable wheels 15 is highly likely, the gain Gr is set at 1.

(a2) If the reactive force quantity ratio Rf satisfies Rf1<Rf<Rf2, the gain Gr is reduced gradually from 1 to 0 in response to increase of the reactive force quantity ratio Rf.

(a3) If the reactive force quantity ratio Rf satisfies Rf2≤Rf, specifically if the grip factor of the steerable wheels 15 is so high that the occurrence of slipping at the steerable wheels 15 is not likely, the gain Gr is set at zero 0.

The road information compensating unit 45 calculates the correction value Tr by multiplying the second assist component Ta2 by the gain Gr calculated by the gain calculating unit 45b. The gain Gr changes in the range 0≤Gr≤1. This changes the correction value Tr in the range 0≤Tr≤Ta2. As a result, the corrected first assist component Ta1' is determined as Ta1−Gr·Ta2, thereby determining the assist command value Tas as Ta1+(1−Gr)Ta2. In this way, the road information compensating unit 45 functions as an adjusting unit that adjusts the absolute value of the second assist component Ta2 included in the assist command value Tas based on the reactive force quantity ratio Rf.

The following describes operation of the electric power steering apparatus of this embodiment.

In the electric power steering apparatus of this embodiment, if the reactive force quantity ratio Rf is less than or equal to the first threshold value Rf1, specifically if the grip factor of the steerable wheels 15 is so low that the occurrence of slipping at the steerable wheels 15 is highly likely, the road information compensating unit 45 equalizes the correction value Tr with the value of the second assist component Ta2. Specifically, the road information compensating unit 45 eliminates the second assist component Ta2 completely from the assist command value Tas. Thus, an assist torque determined based on the steered angle feedback control is not given to the steering shaft 11, so that the steerable wheels 15 are steered in accordance with the road surface condition. This allows the driver to obtain a steering sensation responsive to a low μ road where the occurrence of slipping at the steerable wheels 15 is highly likely while the driver is traveling on the low μ road. Further, the driver is warned of a situation where the occurrence of slipping at the steerable wheels 15 is highly likely since the driver can notice this situation based on the steering sensation. This increases the safety of traveling of the vehicle.

If the reactive force quantity ratio Rf is greater than or equal to the second threshold value Rf2, specifically if the grip factor of the steerable wheels 15 is so high that the occurrence of slipping at the steerable wheels 15 is not likely, the road information compensating unit 45 sets the correction value Tr at zero. Specifically, the road information compensating unit 45 does not adjust the second assist component Ta2 included in the assist command value Tas. Thus, an assist torque determined based on the steered angle feedback control is given to the steering shaft 11. This cancels reverse input vibration from the steerable wheels 15 on a normal road where the occurrence of slipping at the steerable wheels 15 is not likely, thereby achieving a favorable steering sensation.

If the reactive force quantity ratio Rf is in a range between the first and second threshold values Rf1 and Rf2, the road information compensating unit 45 changes the correction value Tr in a range between Ta2 and zero. This gradually changes the second assist component Ta2 included in the assist command value Tas, thereby preventing rapid change of an assist torque. This prevents rapid change of the steering sensation, so that sense of discomfort experienced by the driver is alleviated.

As described above, the electric power steering apparatus of this embodiment achieves the following advantages.

(1) The control device 3 estimates the grip factor of the steerable wheels 15 based on the reactive force quantity ratio Rf obtained by dividing the second assist torque T2 by the sum of the steering torque Th and the first assist torque T1. Thus, the grip factor of the steerable wheels 15 can be estimated easily. If the vehicle is jacked up and the steerable wheels 15 are suspended in the air, the road surface reactive force Frd acting on the steerable wheels 15 becomes zero. Accordingly, the value of the reactive force quantity ratio Rf becomes −1, as in the case where slipping occurs at the steerable wheels 15. Thus, the reactive force quantity ratio Rf can also be used to determine that the vehicle is jacked up and the steerable wheels 15 are suspended in the air.

(2) The control device 3 includes the road information compensating unit 45, which adjusts the second assist component Ta2 included in the assist command value Tas based on the reactive force quantity ratio Rf. The road information compensating unit 45 defines the first threshold value Rf1 as a value of the reactive force quantity ratio Rf that might cause slipping of the steerable wheels 15. If the reactive force quantity ratio Rf satisfies −1≤Rf≤Rf1, the road information compensating unit 45 eliminates the second assist component Ta2 completely from the assist command value Tas. This allows the steerable wheels 15 to be steered in accordance with the road surface condition while the occurrence of slipping at the steerable wheels 15 is highly likely. As a result, a driver can recognize based on a steering sensation that the road surface is in a condition where the occurrence of slipping at the steerable wheels 15 is highly likely.

(3) If the reactive force quantity ratio Rf is greater than or equal to the second threshold value Rf2, the road information compensating unit 45 does not adjust the assist command value Tas. This cancels reverse input vibration from the steerable wheels 15 in a situation where the occurrence of slipping at the steerable wheels 15 is not likely, thereby achieving a favorable steering sensation.

(4) If the reactive force quantity ratio Rf is in a range between the first and second threshold values Rf1 and Rf2, the road information compensating unit 45 gradually changes the second assist component Ta2 included in the assist command value Tas. This prevents rapid change of a steering sensation, so that sense of discomfort experienced by the driver is alleviated.

The aforementioned embodiment may be modified as follows.

In the aforementioned embodiment, the correction value Tr is calculated by multiplying the second assist component Ta2 by the gain Gr corresponding to the reactive force quantity ratio Rf. If the steering wheel 10 is in or near a neutral position, for example, the steering torque Th and the first assist component Ta1 are zero. In this case, if the second assist torque T2 acts in a direction opposite to the direction of the steering torque Th, the reactive force quantity ratio Rf becomes −∞. This may lead to erroneous determination of the grip factor of the steerable wheels 15. In order to prevent such erroneous determination, the road information compensating unit 45 may include an anti-erroneous determination gain calculating unit 45c, as shown in FIG. 8.

Figure 8:
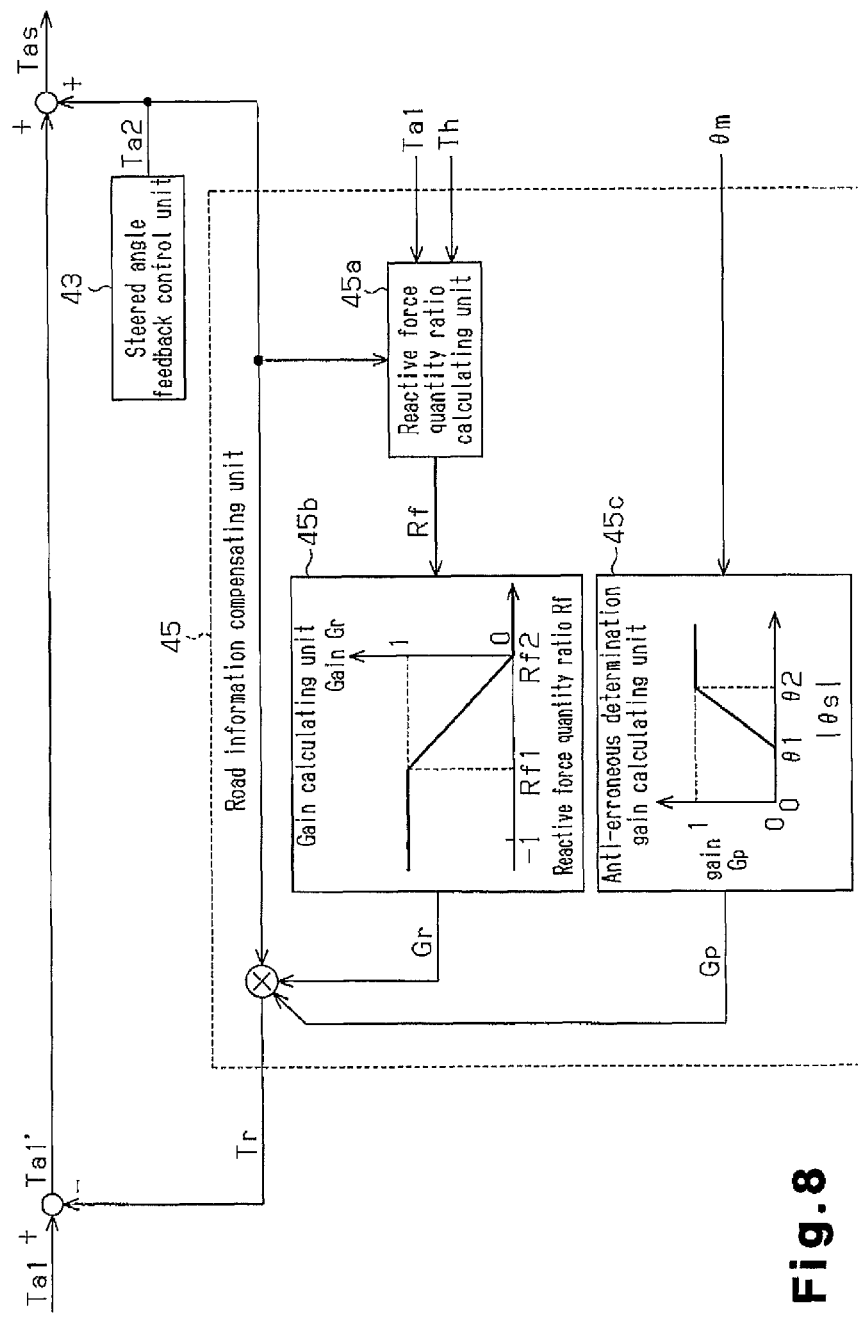
FIG. 8 is control block diagram showing the configuration of a road information compensating unit of an electric power steering apparatus according to a modification of the present invention.

As shown in the graph in FIG. 8, the anti-erroneous determination gain calculating unit 45c calculates an anti-erroneous determination gain Gp in response to a steered angle θs of the steering wheel 10. The anti-erroneous determination gain calculating unit 45c captures the motor rotation angle θm from the rotation angle sensor 5, and calculates the steered angle θs based on the motor rotation angle θm. If the absolute value of the steered angle θs is smaller than a threshold value θ1 set in or near a neutral position of the steering wheel 10, the anti-erroneous determination gain Gp is set at zero. If the absolute value of the steered angle θs exceeds a threshold value θ2 greater than the threshold value θ1, the anti-erroneous determination gain Gp is set at 1. If the steered angle θs satisfies θ1≤|θs|≤θ2, the anti-erroneous determination gain Gp is increased gradually from 0 to 1 in response to increase of the absolute value of the steered angle θs with the intention of preventing rapid change of an assist torque.

The road information compensating unit 45 calculates the correction value Tr by multiplying the second assist component Ta2 by the gain Gr and the anti-erroneous determination gain Gp. If the absolute value of the steered angle θs is smaller than the threshold value θ1, specifically if it is estimated that the steering torque Th and the first assist component Ta1 become zero and that the occurrence of erroneous determination of the grip factor of the steerable wheels 15 is highly likely, the anti-erroneous determination gain Gp is set at zero and the correction value Tr is set at zero accordingly. If the absolute value of the steered angle θs is greater than the threshold value θ2, specifically if it is estimated that the steering torque Th and the first assist component Ta1 become zero and that the occurrence of erroneous determination of the grip factor of the steerable wheels 15 is not likely, the anti-erroneous determination gain Gp is set at 1. In this case, the correction value Tr becomes the same as that in the aforementioned embodiment. Thus, providing the anti-erroneous determination gain calculating unit 45c allows the grip factor of the steerable wheels 15 to be estimated with higher accuracy. This reduces the possibility of improper adjustment of the assist command value Tas, thereby further improving the steering sensation.

The anti-erroneous determination gain calculating unit 45c may be configured to determine the anti-erroneous determination gain Gp in response to the steering torque Th instead of the steered angle θs.

Figure 4:
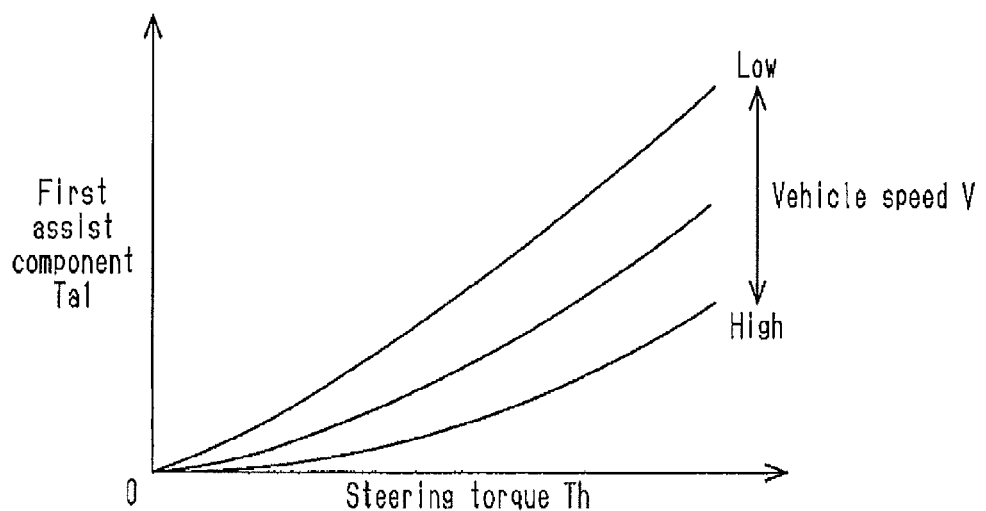
FIG. 4 is a graph showing a relationship between a steering torque, a vehicle speed, and a first assist component established in the electric power steering apparatus according to the embodiment.

In the aforementioned embodiment, the absolute value of the second assist component Ta2 included in the assist command value Tas is adjusted based on the reactive force quantity ratio Rf to allow the driver to determine the road surface condition based on the steering sensation. However, this is not the only configuration of the present invention. As an example, it may include maps as shown in FIG. 4 defining different magnitudes of the first assist component Ta1 corresponding to the steering torque Th. A map to be used for calculation of the first assist component Ta1 is selected from the maps based on the reactive force quantity ratio Rf. More specifically, if it is estimated that the grip factor of the steerable wheels 15 is reduced, a map to be used is selected such that the absolute value of the first assist component Ta1 corresponding to the absolute value of the steering torque Th becomes greater than usual. In other words, a map to be used is selected from the maps such that the absolute value of the first assist component Ta1 corresponding to the absolute value of the steering torque Th increases as the reactive force quantity ratio Rf becomes closer to a value that causes slipping of the steerable wheels 15. This increases an assist toque to lighten steering, so that the driver can reliably notice reduction of the grip factor of the steerable wheels 15.

In the aforementioned embodiment, the gain Gr is set at 1 if the reactive force quantity ratio Rf is less than or equal to the first threshold value Rf1. However, the gain Gr may be set at a value smaller than 1. In other words, if the reactive force quantity ratio Rf is less than or equal to the first threshold value Rf1, the absolute value of the second assist component Ta2 included in the assist command value Tas may be reduced instead of eliminating the second assist component Ta2 from the assist command value Tas. This configuration still makes it hard for an assist torque determined based on the steered angle feedback control to act on the steering shaft 11 during traveling on a low μ road, where the occurrence of slipping at the steerable wheels 15 is highly likely. This allows the driver to obtain a steering sensation responsive to the low μ road.

In the aforementioned embodiment, the first threshold value Rf1 is set at a value that might cause slipping of the steerable wheels 15. The first threshold value Rf1 may also be set at a greater value. This eliminates the second assist component Ta2 completely from the assist command value Tas at an early stage. As a result, the steering sensation experienced by the driver changes before a road surface condition becomes that of a low μ road, so that the driver can notice earlier based on the change of a steering sensation that the road surface condition is approaching that of a low μ road. This increases the safety of traveling of the vehicle further.

Figure 9:
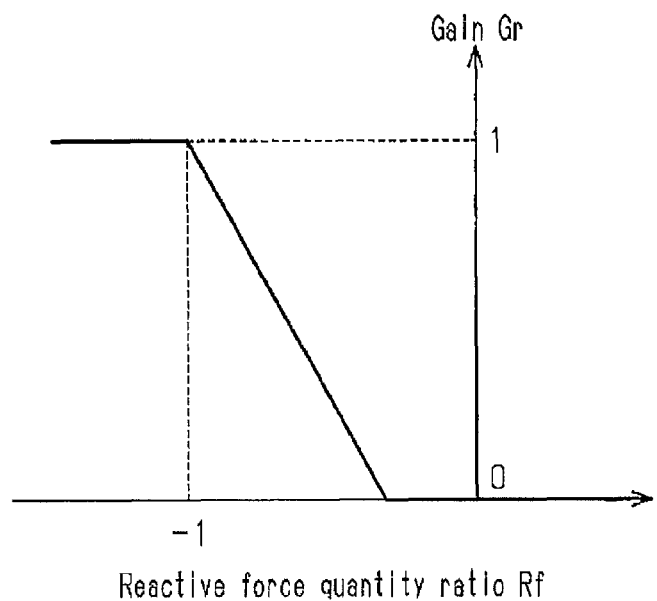
FIG. 9 is a graph showing a relationship between a reactive force quantity ratio and a gain established in an electric power steering apparatus according to another modification of the present invention.

As shown in FIG. 9, the gain calculating unit 45b may set the gain Gr at 1 only when the reactive force quantity ratio Rf is −1. This configuration causes an assist torque determined based on the steered angle feedback control to act on the steering shaft 11 immediately before the occurrence of slipping at the steerable wheels 15, thereby increasing the effect of inhibiting vibration of the steering mechanism 1 compared to the aforementioned embodiment.

Figure 10:
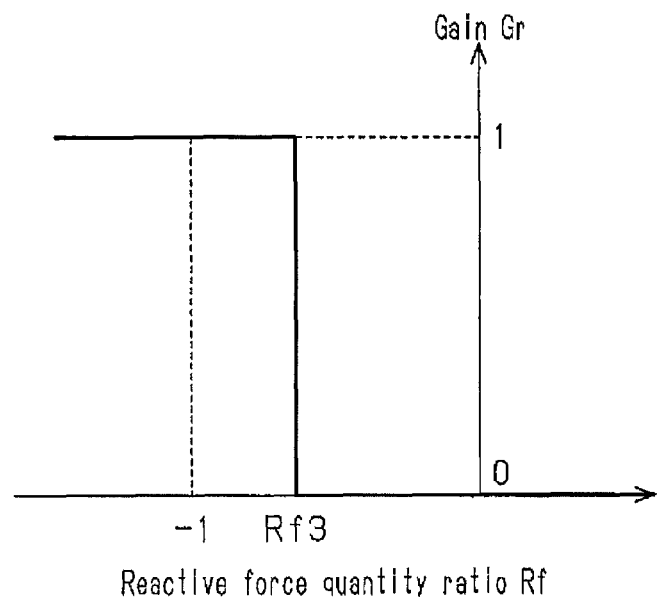
FIG. 10 is a graph showing a relationship between a reactive force quantity ratio and a gain established in an electric power steering apparatus according to yet another modification of the present invention.

In the aforementioned embodiment, if the reactive force quantity ratio Rf is in a range between the first and second threshold values Rf1 and Rf2, the second assist component Ta2 included in the assist command value Tas is changed gradually. However, a zone of this gradual change may be omitted. More specifically, as shown in FIG. 10, a value greater than −1 (such as −0.9) is determined as a threshold value Rf3. If the reactive force quantity ratio Rf is smaller than the threshold value Rf3, the gain Gr is set at 1. If the reactive force quantity ratio Rf is greater than or equal to the threshold value Rf3, the gain Gr is set at zero. What is important is to adjust the magnitude of the second assist component Ta2 included in the assist command value Tas based on the reactive force quantity ratio Rf.

In the aforementioned embodiment, the following expression (3) may be used instead of the expression (2) to determine the reactive force quantity ratio Rf:

$$Rf=|Ta2/(Ta1+Th)| \qquad (3)$$

In this case, it may be determined that the grip factor of the steerable wheels 15 becomes lower as the reactive force quantity ratio Rf becomes closer to 1. Slipping of the steerable wheels 15 can be detected when the reactive force quantity ratio Rf is 1.

The grip factor of the steerable wheels 15 may be estimated based on the total of the steering torque Th and the first and second assist torques T1 and T2. Slipping of the steerable wheels 15 may be detected when this total is zero. What is important is to estimate the grip factor of the steerable wheels 15 based on the steering torque Th and the first and second assist torques T1 and T2.

In the aforementioned embodiment, the steered angle command value calculating unit 42 uses the ideal model that sets the steered angle command value θp* based on the sum of the first assist component Ta1 and the steering torque Th. Alternatively, the steered angle command value calculating unit 42 may use an ideal model that sets the steered angle command value θp* based on only the steering torque Th.

The steered angle command value calculating unit 42 does not always calculate the steered angle command value θp* using an ideal model. Like the basic assist component calculating unit 41, for example, the steered angle command value calculating unit 42 may calculate the steered angle command value θp* using a map.

The basic assist component calculating unit 41 of the aforementioned embodiment sets the first assist component Ta1 based on the steering torque Th and the vehicle speed V. Alternatively, the basic assist component calculating unit 41 may set the first assist component Ta1 based on only the steering torque Th, for example. The basic assist component calculating unit 41 may execute what is called phase compensation control by which the phase of the steering torque Th detected by the torque sensor 4 is changed based on a gradient of change of the first assist component Ta1 (assist gradient) relative to the steering torque Th. The basic assist component calculating unit 41 may also execute what is called torque differential control by which the first assist component Ta1 is increased with increase of a time differential value of the first assist component Ta1.

In the aforementioned embodiment, the present invention is applied to the electric power steering apparatus that applies an assist torque to the steering shaft 11. The present invention may also be applied to an electric power steering apparatus that applies an assist torque to the rack shaft 13.

The invention claimed is:

1. An electric power steering apparatus, comprising:
    an assist mechanism that applies assist torque from a motor to a vehicle steering mechanism; and
    a controller that controls driving of the motor based on an assist command value, wherein
    the controller includes:
        a first assist component calculating unit that calculates a first assist component based on a steering torque transmitted to the steering mechanism;
        a steered angle command value calculating unit that calculates, based on the steering torque, a steered angle command value, which is a target value of a steered angle of a steerable wheel;
        a second assist component calculating unit that executes steered angle feedback control so that the steered angle of the steerable wheel corresponds to the steered angle command value, thereby calculating a second assist component based on the steered angle of the steerable wheel and the steered angle command value; and
    an assist command value calculating unit that calculates the assist command value based on a value obtained by adding the first and second assist components, and
    the controller estimates a grip factor of the steerable wheel on a road surface on which the steerable wheel is traveling based on the steering torque, a first assist torque determined based on the first assist component, and a second assist torque determined based on the second assist component.

2. The electric power steering apparatus according to claim 1, wherein the controller estimates the grip factor of the steerable wheel based on a reactive force quantity ratio obtained by dividing the second assist torque by a sum of the steering torque and the first assist torque.

3. The electric power steering apparatus according to claim 2, wherein the controller estimates that the grip factor of the steerable wheel has reached a value that causes slipping of the steerable wheel if the reactive force quantity ratio is −1.

4. The electric power steering apparatus according to claim 2, wherein the controller further includes an adjusting unit that decreases an absolute value of the second assist component included in the assist command value as the reactive force quantity ratio becomes closer to a value that causes slipping of the steerable wheel.

5. The electric power steering apparatus according to claim 4, wherein if the steering torque is detected or estimated to be zero, the adjusting unit does not decrease the absolute value of the second assist component included in the assist command value.

6. The electric power steering apparatus according to claim 4, wherein the adjusting unit gradually changes the second assist component included in the assist command value in response to change of the reactive force quantity ratio.

7. The electric power steering apparatus according to claim 4, wherein
    the adjusting unit sets a value of the reactive force quantity ratio that causes slipping of the steerable wheel as a first threshold value, and
    if the reactive force quantity ratio is less than or equal to the first threshold value, the adjusting unit eliminates the second assist component from the assist command value.

8. The electric power steering apparatus according to claim 7, wherein the adjusting unit sets a second threshold value greater than the first threshold value, and if the reactive force quantity ratio is greater than or equal to the second threshold value, the adjusting unit does not adjust the second assist component included in the assist command value.

9. The electric power steering apparatus according to claim 2, wherein the controller uses a map to calculate the first assist component determined based on the steering torque, the map is one of a plurality of maps defining different magnitudes of the first assist component corresponding to the steering torque, and the controller selects a map to be used for calculation of the first assist component from the plurality of maps such that an absolute value of the first assist component corresponding to an absolute value of the steering torque increases as the reactive force quantity ratio becomes closer to a value that causes slipping of the steerable wheel.

10. The electric power steering apparatus according to claim 1, wherein if a total sum of the steering torque, the first assist torque determined based on the first assist component, and the second assist torque determined based on the second assist component is zero, the controller estimates that the grip factor of the steerable wheel has reached a value that causes slipping of the steerable wheel.

\* \* \* \* \*